United States Patent
Burr

(10) Patent No.: US 8,120,493 B2
(45) Date of Patent: Feb. 21, 2012

(54) DIRECT COMMUNICATION IN ANTENNA DEVICES

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1460 days.

(21) Appl. No.: 11/613,976

(22) Filed: Dec. 20, 2006

(65) Prior Publication Data

US 2008/0150688 A1    Jun. 26, 2008

(51) Int. Cl.
*G08B 21/00*    (2006.01)
(52) U.S. Cl. ............... 340/572.7; 340/10.1; 340/10.5; 340/572.4
(58) Field of Classification Search .......... 340/10.51, 340/10.52, 10, 572
See application file for complete search history.

(56) References Cited

U.S. PATENT DOCUMENTS

| | | | | |
|---|---|---|---|---|
| 5,055,659 A | * | 10/1991 | Hendrick et al. | 340/10.51 |
| 5,712,628 A | * | 1/1998 | Phillips et al. | 340/10.51 |
| 6,659,343 B2 | * | 12/2003 | Tanaka | 235/380 |
| 2002/0076699 A1 | * | 6/2002 | Peana et al. | 435/6 |
| 2006/0068750 A1 | | 3/2006 | Burr | |
| 2006/0109119 A1 | | 5/2006 | Burr et al. | |
| 2006/0109120 A1 | | 5/2006 | Burr et al. | |
| 2006/0214789 A1 | | 9/2006 | Posamentier et al. | |
| 2007/0075838 A1 | * | 4/2007 | Powell | 340/10.2 |
| 2007/0109116 A1 | | 5/2007 | Burr | |

\* cited by examiner

*Primary Examiner* — Jennifer Mehmood
*Assistant Examiner* — Mark Rushing
(74) *Attorney, Agent, or Firm* — Konrad Raynes & Victor LLP; William K. Konrad

(57) ABSTRACT

Provided are a method, system, and device in which non-RF (radio frequency) data signals are transmitted to a non-RF data port connected to an antenna of a device. The non-RF data signals from the non-RF data port are coupled to a data bus using a low frequency coupler of the device. RF signals are blocked from the data bus using the low frequency coupler of the device. In another aspect, RF signals are transmitted to the antenna of the device and are coupled to an RF port using a high frequency coupler of the device. Non-RF data signals are blocked from the RF port using the high frequency coupler. Additional embodiments are described and claimed.

30 Claims, 6 Drawing Sheets

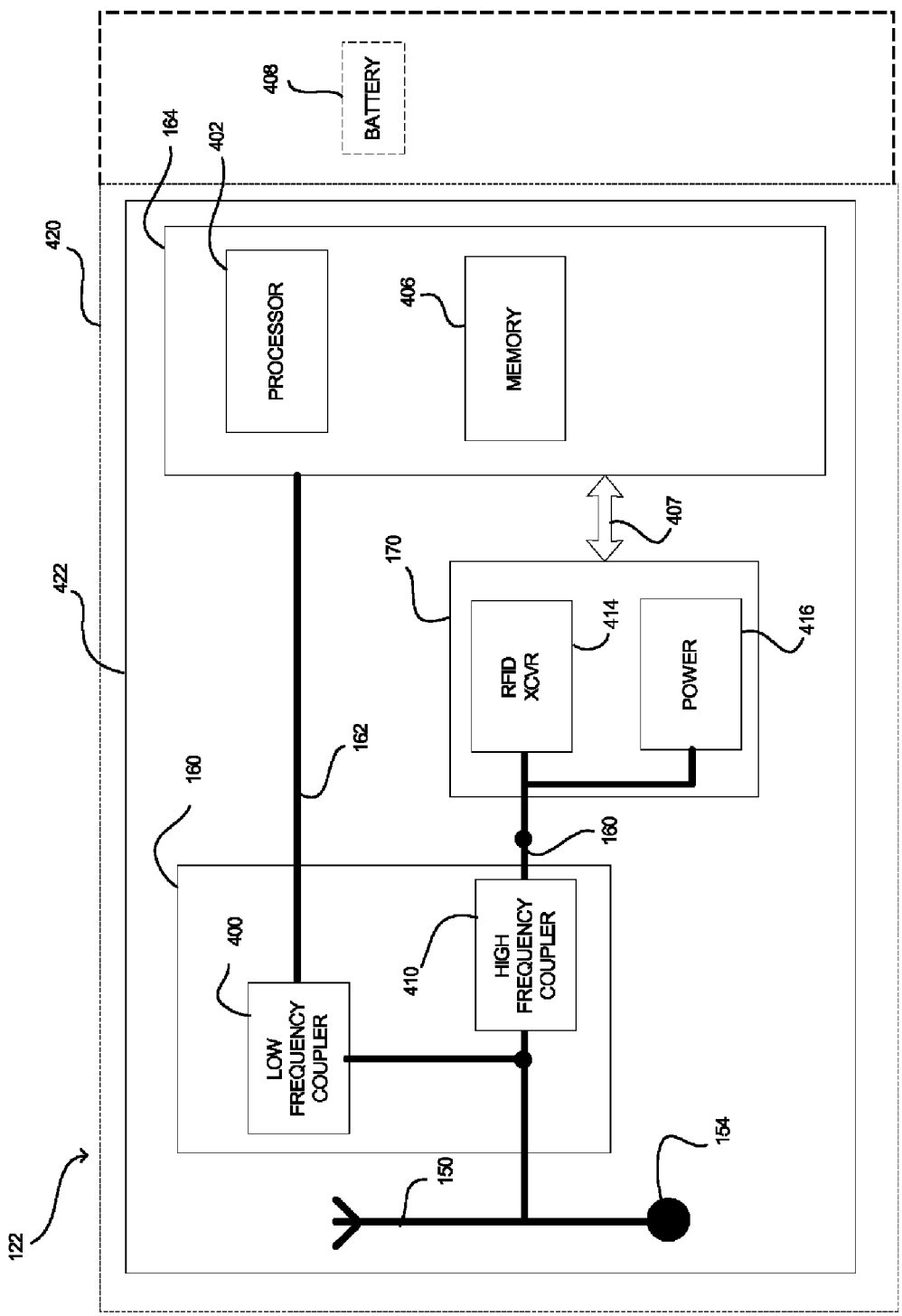

DIRECT COMMUNICATION IN ANTENNA DEVICES

BACKGROUND

Radio Frequency Identification (RFID) is a technology frequently used to identify a target object. An RFID system typically includes an information carrying module known as a tag. A tag may include a microchip having an antenna and may be packaged such that it can be applied to the target object. The tag receives and transmits signals to and from a reader, most often packaged in the form of a transceiver. The tag may contain a unique serial number as well as other information, such as a customer account number. Tags may be implemented in many forms. For example, a tag may have a barcode label printed thereon, may be mounted inside a carton or may be embedded within the target object.

RFID tags may be implemented as active, passive or semi-passive devices. RFID tags function in response to coded RF signals received from a base station transceiver. An active tag generally includes its own energy supply, such as a battery, that may serve as a partial or complete power source for the tag's circuitry and antenna. Batteries may be replaceable or sealed units. A passive tag is generally powered by the RFID reader itself and thus generally does not contain a battery. It typically communicates by reflecting an incident RF carrier back to the reader. As radio waves from the reader are encountered by a passive RFID tag, a voltage is induced from the antenna. The tag may draw power from the induced voltage to energize its circuits. The tag then transmits the encoded information stored in the tag's memory by backscattering the carrier of the reader. A semi-passive RFID tag typically uses a battery to operate its internal circuitry, but also relies on backscattering communication.

Reading is the process of retrieving data stored on an RFID tag by propagating radio waves to the tag and converting the waves propagating from the tag to the reader into data. Information is transferred as the reflected signal is modulated by the tag according to a particular programmed information protocol. Protocols for RFID tags may be categorized in terms of tag to reader over the air interfaces. Three common interface classes are Class-0 (read-only), Class-1 (read/write), and UHF Generation-2 (read/write), for example. UHF Generation-2 provides some improvement upon existing Class-0 and Class-1 standards for worldwide operation and improved performance, for example. ISO18000 standard series RFID tags cover both active and passive RFID technologies.

FIG. 1 is a schematic diagram of one known prior art RFID tag 10 which includes an antenna 12 which is coupled by an impedance matching circuit 14 to an RF port 18 of RF circuit 20. In this example, the impedance matching circuit 14 includes a balun type transformer to match the impedance of the RF circuit 20. The impedance matching circuit 14 may include additional inductive or capacitive components, depending upon the particular application.

The RF circuit 20 typically includes a transceiver which demodulates the incoming RF signal and decodes it in accordance with one or more protocols. The RF circuit 20 often can store data decoded from the incoming RF signals and can retrieve data to be encoded and modulated into outgoing RF signals which are transmitted by the antenna 12. The RF circuit 20 can also scavenge power from the incoming RF signals and store that power to power the circuitry of the RFID tag 10.

FIG. 2 is a top view of a prior art RFID tag 10 which has been integrated on a single substrate 30. The antenna 12 is formed as a metallization deposited on the surface of the substrate 30. The RF circuit 20 and impedance matching circuit may be integrated on the same substrate 30 or on one or more additional integrated circuit substrates. The integrated circuit or circuits of the tag 10 may be encapsulated in one or more tag packages.

An RFID tag such as the RFID tag 10 may be embedded in a product and may be used for inventory control of that product, for example. Also, an RFID tag may be embedded in a product having additional circuitry which interacts with the circuitry of the RFID tag. For example, an RFID tag may be embedded in a sensor such that the output of the sensor may be read by interrogating the RFID tag with a wireless signal. There are numerous other applications for RFID tags.

BRIEF DESCRIPTION OF THE DRAWINGS

FIG. 4 illustrates one example of an RFID device incorporating an RF and non-RF data path in accordance with the description provided herein.

DETAILED DESCRIPTION

In the following description, reference is made to the accompanying drawings which form a part hereof and which illustrate several embodiments. It is understood that other embodiments may be utilized and structural and operational changes may be made without departing from the scope of the descriptions provided.

Figure 3:
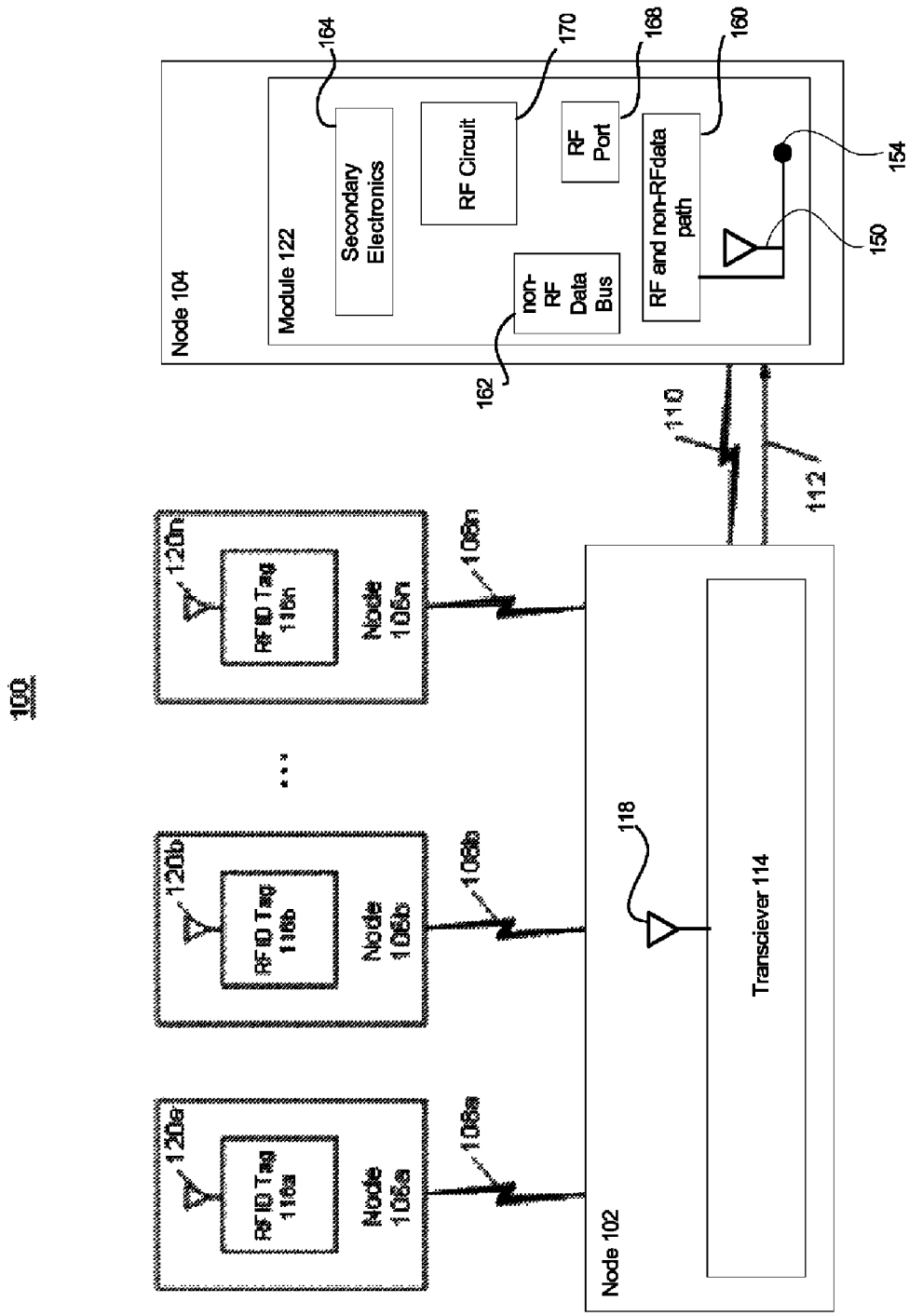
FIG. 3 illustrates one example of an RFID system incorporating an RF and non-RF data path in accordance with the description provided herein.

FIG. 3 illustrates a block diagram of one embodiment of an RFID system 100 which may incorporate one or more of the aspects described herein. System 100 may comprise, for example, a communication system having multiple nodes. A node may comprise any physical or logical uniquely addressable entity in system 100. These nodes may include wireless communication modules such as, for example, RFID tags, as well transceivers for reading and writing information to and from the tags. The RFID tags may have information associated with target objects located throughout system 100. The embodiments are not limited in this context.

The nodes of system 100 may be arranged to communicate different types of information by way of RFID tag protocols. Information exchanged in various embodiments of RFID system 100 may comprise any data associated with target objects. For example, such information may be exchanged through active RFID tags and may comprise data associated with locating, tracking, and safeguarding target objects, including, for example, locating warehouse inventory items, tracking containers with manifest data and safeguarding containers with security type RFID tags, tracking equipment maintenance-parts, tracking vehicles, and locating positions of target objects, for example. Additionally, such information may be exchanged through passive RFID tags and may comprise data associated with accessing target systems such as electronic access control, mobile speed pass at gasoline stations and toll booths, ski pass, luggage tags, passport control, and supply chain item/carton/pallet tracking, among other similar applications, for example. Furthermore, system 100 may comprise, for example, variations and combinations of active and passive RFID tags. Information may comprise data associated with battery assisted passive tags, combined passive (short range) and active (long range) tags, transmit only tags (beacon tag), and real-time locating systems, for example.

The nodes of RFID system 100 may communicate media and control information in accordance with one or more custom or standard protocols. A protocol may comprise a set of predefined rules or instructions to control how the nodes communicate information between each other. As previously discussed, there are several basic forms of over the air interface protocols to enable RFID tag to reader communication, such as, for example, Class-0 (read-only), Class-1 (read/write), and UHF Generation 2 (read/write), among other protocols, for example. The protocol may be defined by one or more protocol standards as promulgated by a standards organization. These may include protocols defined by international RFID standards, such as, International Standards Organization (ISO) RFID standards, International Electrotechnical Commission (IEC) RFID standards, Electronic Product Code (EPC) RFID Standards, International Telecommunications Union (ITU), and Universal Postal Union (UPU) REID standards, for example. The protocols may be defined by National Standards Organizations, such as American National Standards Institute (ANSI) for the United States, British Standards Institute (BSI) for the United Kingdom, and/or other standards for example. The protocols also may be industrial or proprietary custom protocols. The embodiments, however, are not limited in this context. It is appreciated that other protocols may be used, depending upon the particular application.

Portions of RFID system 100 may be implemented as a wired communication system, a wireless communication system, or any combination thereof. Although system 100 may be illustrated using a particular communications media by way of example, it may be appreciated that the principles and techniques discussed herein may be implemented using any type of RFID communication media and accompanying technology. The embodiments, however, are not limited in this context.

When implemented as a wireless system, system 100 may include one or more wireless nodes comprising wireless communication modules, such as, for example. RFID tags, interrogators, transceivers, and the like. These wireless nodes may be arranged to communicate information over one or more types of wireless communication media. An example of a wireless communication media may include portions of a wireless spectrum, such as the radio-frequency (RF) spectrum. The wireless nodes may include components and interfaces suitable for communicating information signals over a designated wireless spectrum, such as one or more antennas, wireless transmitters/receivers ("transceivers"), amplifiers, filters, control logic, and so forth. Examples for the antenna may include an internal antenna, an omni-directional antenna, a monopole antenna, a dipole antenna, a lead-frame antenna, an end-fed antenna, a circularly polarized antenna, a patch antenna, a plane-inverted F antenna, a micro-strip antenna, a diversity antenna, a dual antenna, an antenna array, and so forth. The embodiments are not limited in this context. It is appreciated that other types of antennas may be used, depending upon the particular application.

Referring again to FIG. 3, RFID system 100 may comprise nodes 102, 104, 106a-106n, for example. Although FIG. 3 is shown with a limited number of nodes arranged in a certain topology, it may be appreciated that system 100 may include additional or fewer nodes arranged in any topology desired for a given implementation. Node 102 may communicate with nodes 106a-106n via RFID wireless communication links 108a-108n. In addition node 102 may communicate with node 104 via wireless communication link 110, wired link 112, or any combination thereof, for example. In one embodiment, wireless communication link 110 also may comprise a wireless RFID link, for example. In one embodiment, transceiver 114 communicates with module 122. In one embodiment, module 122 may comprise a wireless device such as an RFID tag such as one of the RFID tags 116a ... 116n, wireless telephone (e.g., cellular telephone), computer, wireless device, cellular telephone or any other wired or wireless communication device described herein. The embodiments are not limited in this context.

In one embodiment, RFID system 100 may comprise node 102. Node 102 may comprise, for example, an RFID reader comprising a communication element. Among other elements and functions, the communication element may include a wireless transceiver 114, for example, to communicate between node 102 and nodes 106a-106n, for example. In one embodiment, transceiver 114 may comprise antenna 118 and may be configured to communicate with one or more wireless modules, such as, for example, RFID tags 116a, 116b, 116n at nodes 106a, 106b, 106n, respectively, for example. Each RFID tag 116a, 116b, 116n comprises an antenna 120a, 120b, 120n, respectively.

RFID tags 116a-116n may communicate with node 102 by way of multiple over the air interface protocols, for example. In one embodiment, RFID tags 116a-116n which may include a module such as module 122, may comprise any one of or any combination of Class-0 (read-only), Class-1 (read/write), UHF Generation 2 (read/write), and ISO18000 classes of RFID tags discussed above, among other RFID tag classes, for example. In one embodiment, RFID tags 116a-116n may comprise active, passive, and/or semi-passive RFID tags, for example.

In general operation, RFID system 100 may comprise an RFID system to dynamically track and monitor target objects located therein. In one embodiment, system 100 may communicate information between node 102 and node 104, and between node 102 and nodes 106a-106n, at any time, and simultaneously read and write information from and to RFID tags 116a-116n, respectively. For example, transceiver 114 may read and write information from and to RFID tags 116a-116n to track target objects such as serial numbers of target objects and components contained therein.

In the embodiment of FIG. 3, the module 122 of the node 104 has an antenna 150 which is adapted to receive RF signals from a communication device such as the transceiver 114 of node 102. In addition, the antenna 150 of the module 122 of node 104 has a non-RF data port 154 which is adapted to conduct non-RF data signals. As explained in greater detail below, an RF and non-RF data path 160 is adapted to couple non-RF data signals between the non-RF data port 154 and secondary electronics 164 having a data bus 162 of the module 122. The secondary electronics 164 may include digital circuitry from the complex to the simple. For example, the secondary electronics 164 may include a microprocessor or a few switches.

In accordance with one aspect of the present description, the non-RF data port 154 and the RF and non-RF data path 160 can provide a secure data path by which data may be uploaded to or downloaded from the module 122 without wireless transmission of the data. Thus, for example, the module 122 may be an RFID tag embedded in a product used for monitoring security checkpoints. At the conclusion of a round of security checks, data may be downloaded from the secondary electronics 164 of the module 122 via the data bus 162, the RF and non-RF data path 160 and the non-RF data port 154 without wirelessly communicating that data. As another example, the module 122 may be an RFID tag which is embedded in a product for which certain parameters of operation are to be updated. The updated parameter information may be downloaded to the secondary electronics 164 of the module 122 via the non-RF data port 154, the data path 160 and the data bus 162 without wirelessly communicating that data.

In a further aspect, the RF and non-RF data path 160 may be further adapted to substantially block direct coupling of RF signals between the antenna 154 and the data bus 162 of the secondary electronics 164. Thus, the RF and non-RF data path 160 can permit non-RF data signals to pass to or pass from secondary electronics 164, while blocking RF signals received at or transmitted by the antenna 150, from passing directly to the secondary electronics of the module 122. Thus any interference with the operation of the secondary electronics which may be caused by the transmission or receipt of RF signals by the module 122, may be substantially reduced or eliminated.

In yet another aspect of the present description, the RF and non-RF data path 160 may be adapted to couple RF signals between the antenna 150 and an RF port 168 coupled to an RF circuit 170 of the module 122. Thus, data carried by RF signals received by the antenna 150 may be demodulated and decoded by an RF circuit 170.

In still another aspect of the present description, the RF and non-RF data path 160 may be further adapted to substantially block coupling of non-RF data signals between the non-RF data port 154 and the RF port 168 of the module 122. Thus any interference with the operation of the RF circuit which may be caused by communications between the non-RF data port 154 and the secondary electronics of the module 122, may be substantially reduced or eliminated.

FIG. 4 shows a more detailed example of a module 122 in accordance with the present description. As shown therein, the RF and non-RF data path 160 includes a low frequency coupler 400 which couples the non-RF data port 154 of the antenna 150 to the data bus 162 of the secondary electronics 164. In this example, the data bus 162 is a serial data bus. However, it is appreciated that the data bus 162 may be any suitable data bus including parallel, synchronous, asynchronous and any other conduit capable of transmitting data, depending upon the particular application.

The secondary electronics 164 of this example may include a processor 402 and/or a memory 406, for example. It is appreciated that the secondary electronics 164 may include programmable or dedicated logic circuitry. Still further, the secondary electronics may be relatively complicated such as that represented by a microprocessor or may be relatively simple in nature such as a switch. The secondary electronics 164 may be digital or analog, depending upon the particular application. The secondary electronics 164 may include a sensor such as a security sensor or a bioarray sensor, for example.

In this example, the secondary electronics 164 are depicted as being separate from the RF circuitry 170 and coupled by a data bus 407. In addition, the secondary electronics 164 are depicted as optionally being powered by a separate power source such as a battery 408. However, in other applications, the secondary electronics 164 may be located in the same locale of the module 122 as the RF circuit 170 and may be powered by the same scavenged power as the RF circuit 170. In this example, the data bus 407 is depicted as a parallel data bus. However, it is appreciated that the data bus 162 may be any suitable data bus including serial, parallel, synchronous, asynchronous and any other conduit capable of transmitting data, depending upon the particular application.

The RF and non-RF data path 160 further includes a high frequency coupler 410 which couples the antenna 150 to the RF port 160 of the RF circuit 170. In this example, the RF circuit 170 includes an RFID transceiver 414 which demodulates and decodes data carried by incoming RF signals from the antenna 150. In addition, the RFID transceiver generates RF signals which are transmitted through the antenna 150. A power circuit 416 can scavenge power from the incoming RF signals for purposes of powering the RF circuit 170.

In one example, the module 122 may include an integrated circuit package which contains one or more integrated circuit dies. The integrated package may be represented by the outline 420. The antenna 150 and its non-RF data port 154, the RF and non-RF data path 160, the RF circuit 170, and the secondary electronics 170 and its data busses 162, 407 may be integrated on a single die as represented by the box 422. The secondary electronics within the package may include a security sensor or a bioarray, for example. Alternatively, these components may be integrated on more than one die and packaged in one or more packages. Similarly, a secondary power source such as a battery 408 may be packaged in the same package as the secondary electronics 164 or may be packaged separately.

In another example, the antenna 150 and its non-RF data port 154, the RF and non-RF data path 160, the RF circuit 170, and the secondary electronics 170 and its data bus 162 may be integrated either together or separately on a printed circuit board as represented by the outline 420. Similarly, a secondary power source such as a battery 408 may be integrated on the same printed circuit board as the secondary electronics 164 or may be disposed on a separate circuit board.

Figure 5:
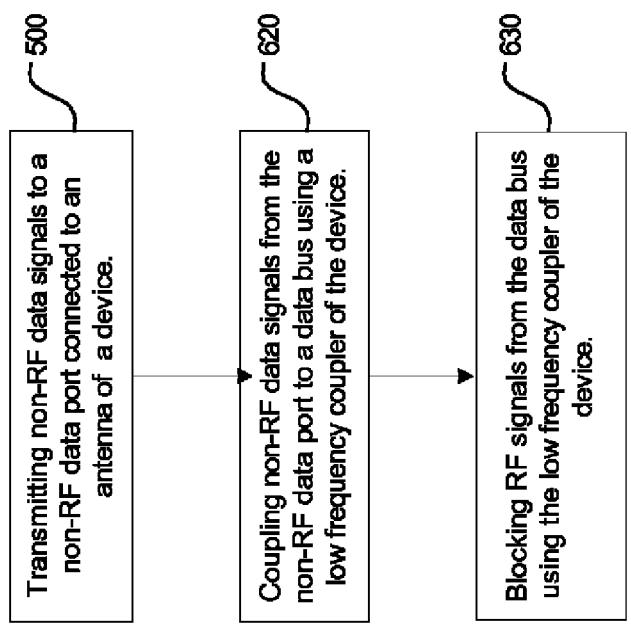
FIG. 5 illustrates one example of operations of an RF and non-RF data path in accordance with the description provided herein.

One example of operations of the module 122 is depicted in FIG. 5. In one operation, non-RF data is transmitted (block 500) from a host such as the RFID reader of node 102, for example, to a non-RF data port such as the non-RF data port 154 of the antenna 150. The RFID reader of node 102 has a wired connection 112 for non-RF data communication with the module 122. It is appreciated that a host may be any suitable data source or data storage device including mainframes, servers, laptop computers, tablet computers, desktop computers, personal digital assistants, telephones, media players and so forth. The host transmits non-RF data to the non-RF data port 154 of the antenna 150 by connecting a suitable conductor such as a wire to the non-RF data port 154. The connection with the host may be a permanent wired connection to the non-RF data port 154 or may be a temporary connection such as by touching a probe to the non-RF data port 154.

Figure 6:
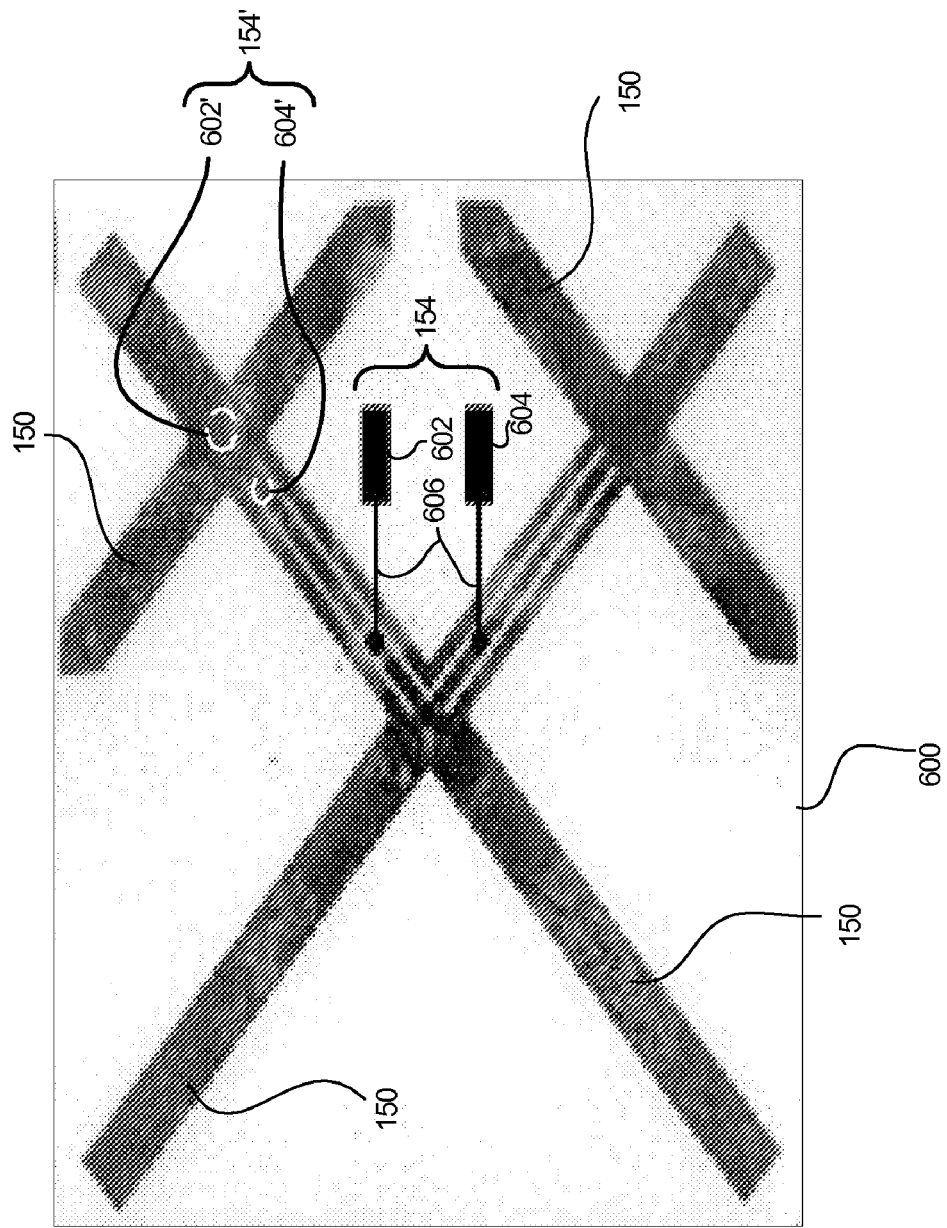
FIG. 6 illustrates an antenna having a direct connect non-RF data port in accordance with one embodiment of the description provided herein.

FIG. 6 shows an example of an antenna 150 formed as a metallization deposited on the surface of the substrate 600. The non-RF data port 154 of the antenna 150 includes a pair of differential conductive contact pads 602, 604, each of which is connected by a conductive metallization conduit 606 to the main body of the antenna 150. It is appreciated that the contact pads 602, 604 and the conduits 606 may alter the RF performance of the antenna 150. Accordingly, it is contemplated that the design of the antenna 150 may account for such alterations.

As previously mentioned, the connection with the host may be a permanent wired connection to the contact pads 602, 604 of the non-RF data port 154. Alternatively, a host may make a temporary connection by touching a probe to the contact pads 602, 604. It is appreciated that the particular manner in which a wired connection is made to the antenna 150, may vary, depending upon the particular application. For example, in some applications, protruding conduits 606 and contact pads 602, 604 may be avoided for a non-RF data port. In one embodiment, contact may instead be made directly to the main body of the antenna 150 as represented by the dotted circles, 602', 604', for example. Hence, the areas designated 602', 604' of the main body of the antenna 150 may function as a non-RF data port 154' as well as function as a conventional part of the RF antenna 150. Contact may be made to the areas 602', 604' by probes or other suitable devices. It is appreciated that contact may be made to other areas of the main body of the antenna, depending upon the particular application.

The antenna 150 depicted in FIG. 6 is one example of a suitable antenna having a non-RF data port 154. As previously mentioned, the antenna 150 may be an internal antenna, an omni-directional antenna, a monopole antenna, a dipole antenna, a lead-frame antenna, an end-fed antenna, a circularly polarized antenna, a patch antenna, a plane-inverted F antenna, a micro-strip antenna, a diversity antenna, a dual antenna, an antenna array, and so forth. The embodiments are not limited in this context. It is appreciated that other types of antennas may be used, depending upon the particular application.

The non-RF data signals transmitted by the host may be coupled (block 620, FIG. 5) from a non-RF data port such as the port 154, to a data bus, such as the data bus 162 of the secondary electronics 164, for example, using a low frequency coupler. FIG. 4 shows an example of a low frequency coupler 400 coupling the non-RF data port 154 of the antenna 150 to the data bus 162 of the secondary electronics 164.

Figure 7:
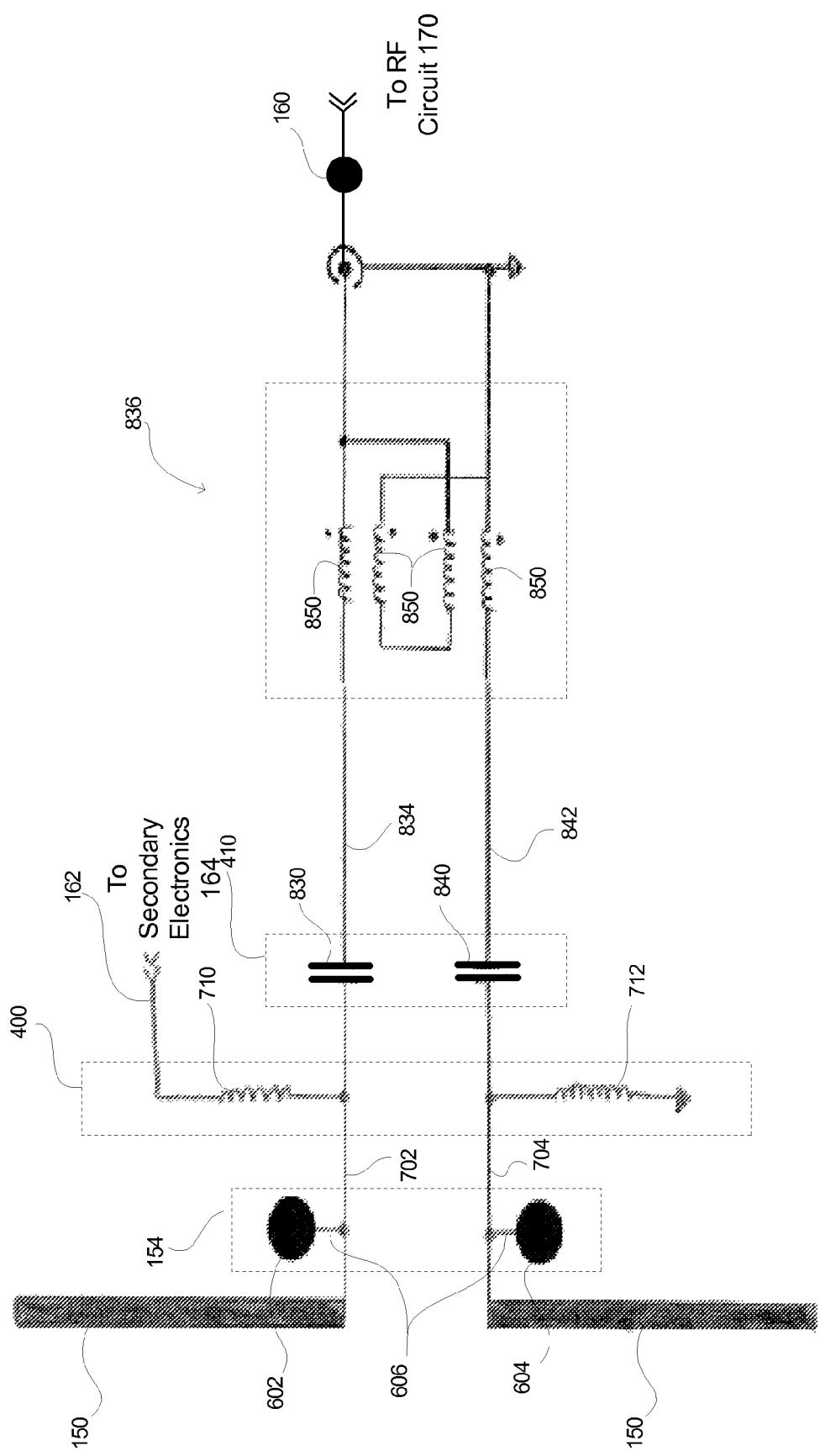
FIG. 7 illustrates an RF and non-RF data path in accordance with one embodiment of the description provided herein.

In another operation, the low frequency coupler also blocks (block 630, FIG. 5) RF signals from reaching the data bus such as the data bus 162 of the secondary electronics 164. FIG. 7 shows one example of a low frequency coupler 400 for a differential non-RF data port 154 having contact pads 602, 604 connected by conduits 606 to the main body of the antenna 150 and to differential conduits 702, 704. As shown in FIG. 7, the low frequency coupler 400 of this example is inductive and includes a first inductor 710 which connects the differential conduit 702 to the data bus 162 of the secondary electronics. A second inductor 712 connects the differential conduit 704 to a different potential, such as ground.

The inductors 710 and 712 act as a short to low frequency signals and as an open circuit to high frequency signals. As a consequence, the low frequency non-RF data signals from the non-RF data port 154 may be coupled to the data bus 162 of the secondary electronics while any high frequency signals including RF signals from the antenna 150 are effectively blocked from the data bus 162.

In one embodiment, the low frequency coupler 400 may couple signals such as signals below 100 MHz and may block signals such as signals above 100 MHz. In another embodiment, the low frequency coupler 400 may couple signals such as signals below 10 MHz and may block signals such as signals above 10 MHz. In yet another embodiment, the low frequency coupler 400 may couple signals such as signals below 1 MHz and may block signals such as signals above 1 MHz. In still another embodiment, the low frequency coupler 400 may couple signals such as DC or near DC signals and may block signals above DC or near DC. It is appreciated that the particular frequency at which coupling is cut off and blocking begins may vary, depending upon the particular application.

Figure 8:
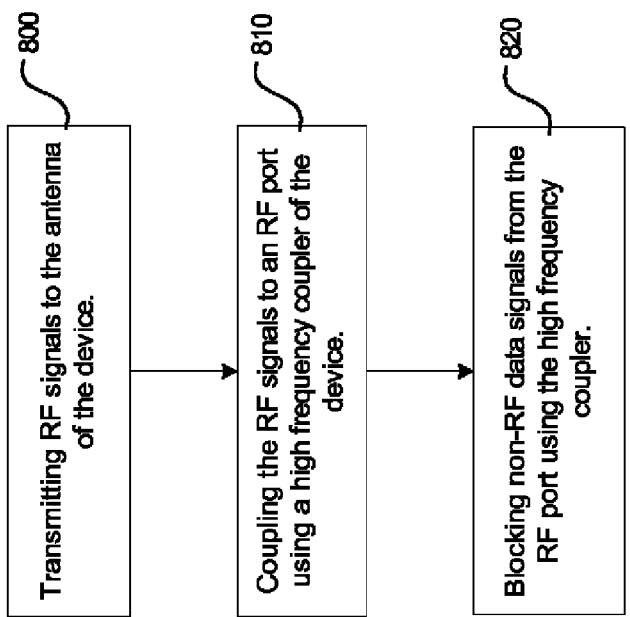
FIG. 8 illustrates another example of operations of an RF and non-RF data path in accordance with the description provided herein.

FIG. 8 depicts an additional example of operations of the module 122. In one operation, RF signals are transmitted (block 800) over the air from a host to an antenna such as the antenna 150 of the module 122. It is appreciated that a host may be any suitable wireless communication device including RFID readers, mainframes, servers, laptop computers, tablet computers, desktop computers, personal digital assistants, telephones, media players and so forth. As previously mentioned, the RFID reader of node 102 has a wireless communication link 110 for RF data communication with the module 122.

In another operation, the RF signals transmitted to an antenna such as the antenna 150 are coupled (block 810) to an RF port such as the RF port 160, using a high frequency coupler such as the high frequency coupler 410. In yet another operation, non-RF data signals such as non-RF data signals from the non-RF data port 154 are blocked (block 820) from an RF port such as the RF port 160 using a high frequency coupler such as the high frequency coupler 410.

FIG. 7 also shows one example of a high frequency coupler 410 for a differential non-RF data port 164 having contact pads 602, 604 connected by conduits 606 to the main body of the antenna 150 and to differential conduits 702, 704. As shown in FIG. 7, the high frequency coupler of this example is capacitive and includes a first capacitor 830 which connects the differential conduit 702 to a differential line 834 of an impedance matching circuit 836. A second capacitor 840 connects the differential conduit 704 to another differential line 842 of the impedance matching circuit 836.

The capacitors 830 and 840 act as a short to high frequency signals and as an open circuit to low frequency signals. As a consequence, the high frequency RF signals from the antenna 150 may be coupled to the impedance matching circuit 836 and the RF port 160, while any low frequency signals including non-RF data signals from the non-RF data port 154 of the antenna 150 are effectively blocked from the impedance matching circuit 836 and the RF port 160 to the RF circuit 170 (FIG. 4).

In one embodiment, the high frequency coupler 410 may couple signals such as signals above 100 MHz and may block signals such as signals below 100 MHz. In another embodiment, the high frequency coupler 410 may couple signals such as signals above 10 MHz and may block signals such as signals below 10 MHz. In yet another embodiment, the high frequency coupler 410 may couple signals such as signals above 1 MHz and may block signals such as signals below 1 MHz. In still another embodiment, the high frequency coupler 410 may couple signals such as signals above DC or above near DC signals and may block signals at or near DC. It is appreciated that the particular frequency at which blocking ends and coupling begins may vary, depending upon the particular application.

Figure 1:
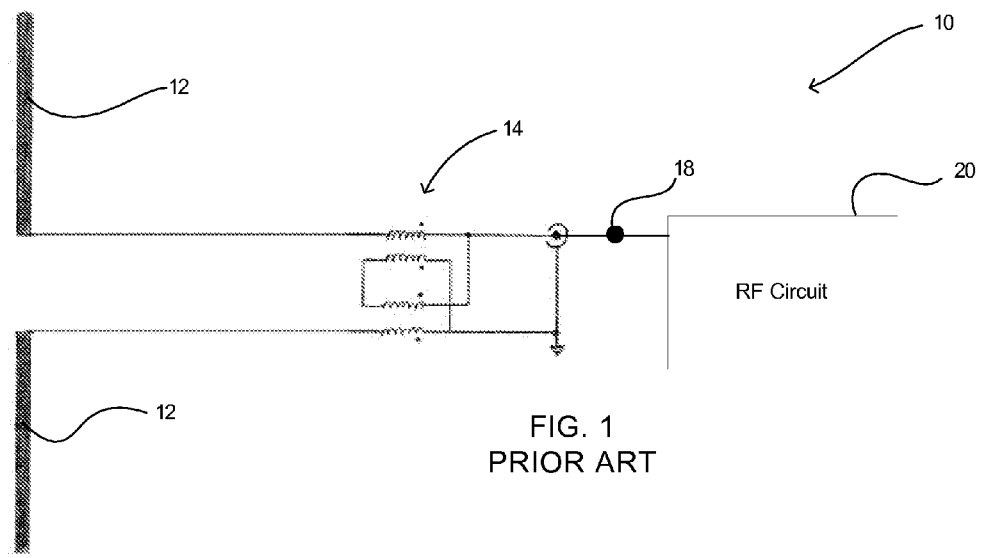
FIG. 1 is a prior art example of an RF path from an antenna of an RFID device.
Figure 2:
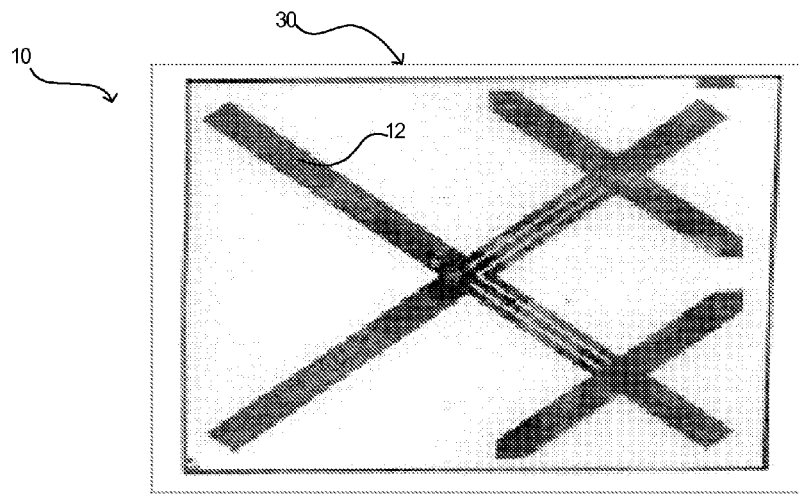
FIG. 2 is a prior art example of an integrated circuit antenna of an RFID device.

In the illustrated embodiment, the impedance matching circuit 836 is a balun type transformer having inductors 850 cross coupled between the differential conduits 834, 842. The impedance matching circuit 836 may be similar to the impedance matching circuit 14 of FIG. 1. However, the values of the elements of the circuit 836 may vary to accommodate the impedances of the RF and non-RF data path 160 and the non-RF data port 154. It is further appreciated that other types of impedance matching circuits may be used, depending upon the particular application. Also, in some applications, an impedance matching circuit may be eliminated.

Additional Embodiment Details

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention. Further, although process operations, method operations, algorithms or the like may be described in a sequential order, such processes, methods and algorithms may be configured to work in alternate orders. In other words, any sequence or order of operations that may be described does not necessarily indicate a requirement that the operations be performed in that order. The operations of processes described herein may be performed in any order practical. Further, some operations may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article. The functionality and/or the features of a device may be alternatively embodied by one or more other devices which are not explicitly described as having such functionality/features. Thus, other embodiments of the present invention need not include the device itself.

The described operations may be implemented as a method, apparatus or article of manufacture using standard programming and/or engineering techniques to produce software, firmware, hardware, or any combination thereof. The term "article of manufacture" as used herein refers to code or logic implemented in a tangible medium, where such tangible medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The tangible medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any suitable information bearing medium.

In certain implementations, the embodiments may be included in a computer system including nonvolatile memory and a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, embodiments may be included in a system that does not include nonvolatile memory or a storage controller, such as certain hubs and switches.

In certain implementations, the embodiments may be implemented in a computer system including a video controller to render information to display on a monitor electrically coupled to the computer system including the host software driver and network controller, such as a computer system comprising a desktop, workstation, server, mainframe, laptop, handheld computer, telephone, etc. Alternatively, the features described herein may be implemented in a computing device that does not include a video controller, such as a switch, router, etc.

The foregoing description of various embodiments has been presented for the purposes of illustration. It is not intended to be exhaustive or to limit to the precise form disclosed. Many modifications and variations are possible in light of the above teaching.

What is claimed is:

1. An apparatus, comprising:
an antenna adapted to receive RF signals, said antenna having a non-RF data port adapted to conduct non-RF data signals;
a data bus; and
a low frequency coupler coupling said data bus to said non-RF data port of said antenna, and adapted to couple said non-RF data signals between said non-RF data port of said antenna, and said data bus, said low frequency coupler being further adapted to block coupling of RF signals between said antenna and said data bus.

2. The apparatus of claim 1 further comprising:
an RF port; and
a high frequency coupler coupling said antenna to said RF port, and adapted to couple RF signals between said antenna and said RF port, said high frequency coupler being further adapted to block coupling of said non-RF data signals between said non-RF data port and said RF port.

3. The apparatus of claim 2 wherein said low frequency coupler is an inductive coupling.

4. The apparatus of claim 3 wherein said high frequency coupler is a capacitive coupling.

5. The apparatus of claim 4 further comprising a radio frequency identification (RFID) device wherein said device comprises said antenna having said non-RF data port, said data bus, said low frequency coupler, said RF port and said high frequency coupler.

6. The apparatus of claim 5 wherein said device further comprises a data processor coupled to said data bus and adapted to process said non-RF data signals from said non-RF data port and to transmit non-RF data signals to said non-RF data port via said data bus and said low frequency coupler.

7. The apparatus of claim 6 wherein said device further comprises an RF transceiver coupled to said RF port and adapted to transmit RF signals to said antenna and receive RF signals from said antenna via said high frequency coupler.

8. The apparatus of claim 5 further comprising an integrated circuit package having at least one integrated circuit die within said package, wherein said RFID device is integrated within said at least one die.

9. The apparatus of claim 6 further comprising an integrated circuit package having at least one integrated circuit die within said package, wherein said RFID device is integrated within said at least one die.

10. The apparatus of claim 5 further comprising a printed circuit board having integrated thereon said RFID device.

11. The apparatus of claim 6 further comprising a printed circuit board having integrated thereon said RFID device.

12. The apparatus of claim 5 further comprising a substrate and a bioarray integrated on said substrate, said RFID device also being integrated on said substrate.

13. The apparatus of claim 5 further comprising a product wherein said RFID device is an RFID tag embedded in said product.

14. A method, comprising:
    transmitting non-RF data signals to a non-RF data port of an antenna of a device;
    coupling said non-RF data signals from said non-RF data port to a data bus using a low frequency coupler of said device; and
    blocking RF signals from said data bus using said low frequency coupler of said device.

15. The method of claim 14 further comprising:
    transmitting RF signals to said antenna of said device;
    coupling said RF signals to an RF port using a high frequency coupler of said device; and
    blocking said non-RF data signals from said RF port using said high frequency coupler.

16. The method of claim 15 wherein said non-RF data signal coupler is an inductive coupling.

17. The method of claim 16 wherein said RF signal coupler is a capacitive coupling.

18. The method of claim 17 wherein a radio frequency identification (RFID) device comprises said antenna having said non-RF data port, said data bus, said low frequency coupler, said RF port and said high frequency coupler.

19. The method of claim 18 further comprising processing said non-RF data signals from said non-RF data port and transmitting via said data bus and low frequency coupler, non-RF data signals to said non-RF data port.

20. The method of claim 19 further comprising transmitting via said high frequency coupler, RF signals to said antenna via said high frequency coupler.

21. The method of claim 18 wherein said RFID device is integrated within at least one die of an integrated circuit package.

22. The method of claim 19 wherein said processing and transmitting of non-RF data signals is performed by a data processor which is part of said RFID device which is integrated within at least one die of an integrated circuit package.

23. The method of claim 18 wherein said RFID device is integrated on a printed circuit board.

24. The method of claim 19 wherein said processing and transmitting of non-RF data signals is performed by a data processor which is part of said RFID device which is integrated on a printed circuit board.

25. The method of claim 18 wherein said RFID device is integrated on a substrate with a bioarray.

26. The method of claim 18 wherein said RFID device is an RFID tag.

27. A communication system, comprising:
    a plurality of nodes, said nodes including a plurality of radio frequency identification (RFID) tags and a host having an RFID reader, at least one of said RFID tags comprising:
        an antenna adapted to receive RF signals, said antenna having a non-RF data port adapted to conduct non-RF data signals;
        a data bus; and
        a low frequency coupler coupling said data bus to said non-RF data port of said antenna, and adapted to couple said non-RF data signals between said non-RF data port of said antenna, and said data bus, said low frequency coupler being further adapted to block coupling of RF signals between said antenna and said data bus.

28. The system of claim 27 wherein said at least one RFID tag further comprises:
    an RF port; and
    a high frequency coupler coupling said antenna to said RF port, and adapted to couple RF signals between said antenna and said RF port, said high frequency coupler being further adapted to block coupling of said non-RF data signals between said non-RF data port and said RF port.

29. The system of claim 28 wherein said low frequency coupler is an inductive coupling.

30. The system of claim 29 wherein said high frequency coupler is a capacitive coupling.

* * * * *